(12) United States Patent
Bourilkov et al.

(10) Patent No.: US 9,887,463 B2
(45) Date of Patent: Feb. 6, 2018

(54) OMNI-DIRECTIONAL ANTENNA FOR A CYLINDRICAL BODY

(71) Applicant: DURACELL U.S. OPERATIONS, INC., Wilmington, DE (US)

(72) Inventors: Jordan Todorov Bourilkov, Bethany, CT (US); Sergio Coronado Hortal, Bethel, CT (US); William Fitler Morris, Newtown, CT (US); Steven Jeffrey Specht, Brookfield, CT (US); Calvin Giles, Cambridge (GB); Konstantin Stefanov, Cambridge (GB)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 0 days.

(21) Appl. No.: 15/332,925

(22) Filed: Oct. 24, 2016

(65) Prior Publication Data

US 2017/0040698 A1   Feb. 9, 2017

Related U.S. Application Data

(63) Continuation of application No. 13/974,778, filed on Aug. 23, 2013, now Pat. No. 9,478,850, which is a
(Continued)

(51) Int. Cl.
| | |
|---|---|
| *H01Q 23/00* | (2006.01) |
| *H01Q 7/08* | (2006.01) |
| *H01Q 1/38* | (2006.01) |
| *H01Q 7/00* | (2006.01) |
| *H01Q 1/20* | (2006.01) |
| *H01Q 1/22* | (2006.01) |

(Continued)

(52) U.S. Cl.
CPC .............. *H01Q 7/08* (2013.01); *H01M 10/48* (2013.01); *H01Q 1/20* (2013.01); *H01Q 1/225* (2013.01); *H01Q 1/2225* (2013.01); *H01Q 1/38* (2013.01); *H01Q 7/00* (2013.01); *H01Q 9/26* (2013.01); *H01Q 23/00* (2013.01); *H02J 7/0047* (2013.01); *H02J 7/0004* (2013.01)

(58) Field of Classification Search
CPC ..... H02J 7/0004; H01Q 1/2225; H01Q 23/00; H01Q 7/00; H01M 10/425
USPC ......................... 343/904, 866, 867, 741, 742
See application file for complete search history.

(56) References Cited

U.S. PATENT DOCUMENTS

| | | |
|---|---|---|
| 5,587,573 A | 12/1996 | Owen et al. |
| 6,774,685 B2 | 8/2004 | O'Toole et al. |

(Continued)

FOREIGN PATENT DOCUMENTS

| | | |
|---|---|---|
| CN | 102544709 A | 7/2012 |
| JP | 2006139544 A | 6/2006 |

(Continued)

OTHER PUBLICATIONS

International Search Report in corresponding International Application No. PCT/US2014/038586 dated Sep. 1, 2014.
(Continued)

*Primary Examiner* — Dameon E Levi
*Assistant Examiner* — Hasan Islam
(74) *Attorney, Agent, or Firm* — Marshall, Gerstein & Borun LLP (57) ABSTRACT

An antenna for a cylindrical body may include a flexible substrate with the antenna on it with a first terminal and a second terminal electrically connected to an integrated circuit, the flexible substrate coupled to the cylindrical body.

22 Claims, 11 Drawing Sheets

Related U.S. Application Data continuation-in-part of application No. 13/901,225, filed on May 23, 2013, now abandoned.

(51) Int. Cl.
  *H01M 10/48* (2006.01)
  *H01Q 9/26* (2006.01)
  *H02J 7/00* (2006.01)

(56) References Cited

U.S. PATENT DOCUMENTS

| | | |
|---|---|---|
| 7,511,454 B1 | 3/2009 | Legg |
| 7,911,182 B2 | 3/2011 | Cargonja et al. |
| 8,031,054 B2 | 10/2011 | Tuttle |
| 8,106,845 B2 | 1/2012 | Savry |
| 2004/0183742 A1 | 9/2004 | Goff et al. |
| 2006/0208898 A1 | 9/2006 | Swanson et al. |
| 2008/0206627 A1 | 8/2008 | Wright |
| 2010/0209744 A1 | 8/2010 | Kim |
| 2012/0086615 A1 | 4/2012 | Norair |

FOREIGN PATENT DOCUMENTS

| | | |
|---|---|---|
| JP | 2006324074 A | 11/2006 |
| JP | 2012170262 A | 9/2012 |
| WO | WO-2012/051272 A2 | 4/2012 |

OTHER PUBLICATIONS

Notice of Rejection (English translation), Japanese patent application No. 2016-514988, dated Dec. 6, 2016.
Notification of the Second Office Action, Chinese patent application No. 201480029038.X, dated Sep. 26, 2017.
Office Action for corresponding European Patent Application No. EP 14 733 419.7, dated Dec. 8, 2017.

OMNI-DIRECTIONAL ANTENNA FOR A CYLINDRICAL BODY

CROSS REFERENCE TO RELATED APPLICATIONS

The present application is a continuation application of U.S. application Ser. No. 13/974,778, filed Aug. 23, 2013, which is a continuation-in-part of U.S. application Ser. No. 13/901,225 filed May 23, 2013, the entirety of both of which are incorporated by reference herein.

FIELD OF THE INVENTION

The present disclosure is generally directed to antenna apparatuses for cylindrical bodies.

BACKGROUND

Radio frequency identification (RFID) is gaining in popularity in applications such as security, inventory management, access control, etc. As a sub-category, near field communication (NFC) using the same carrier frequency as RFID in the High-Frequency (HF) range (13.56 MHz) are used in applications such as wireless sensors. The number of NFC-enabled smart phones is growing as well as the various applications of passive or active transponders (RFID tags/NFC tags). Current RFID/NFC loop antennas used in RFID/NFC tags resonate in the 13.56 MHz range and are typically dipole antennas with a rectangular or circular shape. The spatial response of the dipole antenna is two-directional with maximums when the reader's antenna and the tag antenna are parallel and nulls when they are perpendicular.

If a 3-dimensional (3D) response is required, e.g. when the object carrying the RFID/NFC tag is placed in an arbitrary position or moving in an arbitrary direction, two antennas that are substantially orthogonal to each other are required. Such a combination is difficult to fabricate, tune, and match to the RFID/NFC chip and will most likely require a custom Application Specific Integrated Circuit (ASIC). Because a typical battery is cylindrical, the combination is further complicated if the antenna is required to be placed on a cylinder.

Accordingly, a need exists for a single omni-directional antenna for a cylindrical body for RFID and/or NFC applications.

SUMMARY

In one embodiment, an apparatus for an antenna for a cylindrical body may include a flexible substrate coupled to a cylindrical body. The flexible substrate may have an antenna on it with a first terminal and a second terminal coupled to an integrated circuit. The integrated circuit may include an analog to digital converter and a communication circuit and be configured to sense a condition of a battery and to signally communicate the condition of the battery.

In another embodiment, an apparatus for a folding antenna for a cylindrical body, may include a flexible substrate coupled to a cylindrical body and including an aperture disposed within the flexible substrate and configured to allow the cylindrical body to pass within the aperture and wrap the flexible substrate around the cylindrical body. An antenna with a first terminal and a second terminal may be coupled to the flexible substrate along with an integrated circuit. The integrated circuit may include an analog to digital converter and a communication circuit and be configured to sense a condition of a battery and to signally communicate the condition of the battery to a reader.

In yet another embodiment, an apparatus for a battery status indication circuit on a battery may include a flexible ferrite shield coupled to a cylindrical battery. A continuous loop antenna with a first terminal and a second terminal may be printed on the ferrite shield. An integrated circuit may be electrically coupled to the first terminal and the second terminal of the antenna and may include an analog to digital converter and a communication circuit configured to sense a condition of a battery and signally communicate the condition to a reader. The integrated circuit may be electrically coupled to the battery by a first lead electrically coupled to an anode of the battery and a second lead electrically coupled to a cathode of the battery.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
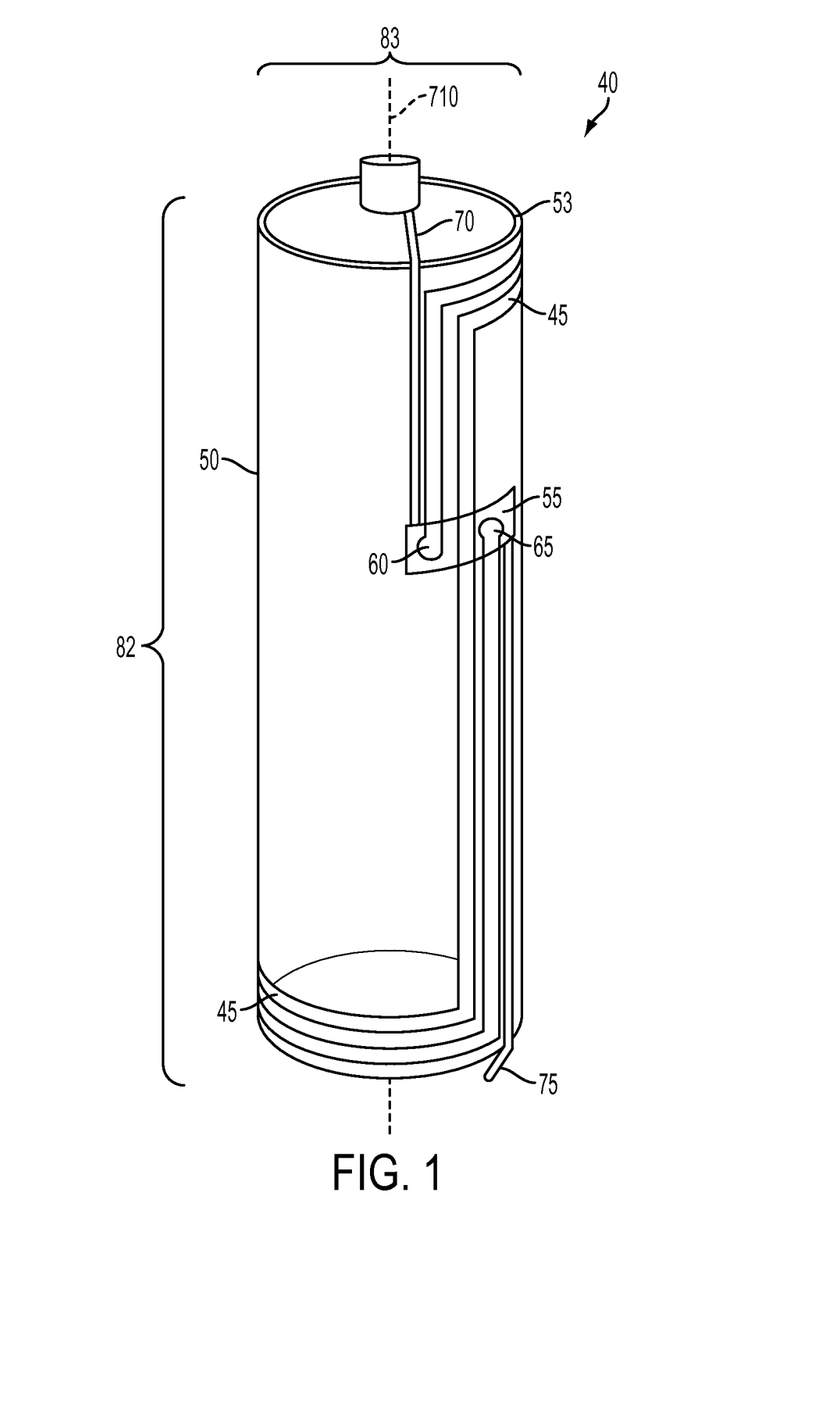
FIG. 1 depicts a printed omni-directional antenna on a cylindrical body according to one or more embodiments shown and described herein.

FIG. 1 generally depicts one embodiment of a single omni-directional antenna that may be placed or printed on a cylindrical body 53 and provide a 3D ability (any orientation of the omni-directional antenna) to be read using RFID/NFC technology. Various embodiments of the omni-directional antenna and the operation of the omni-directional antenna will be described in more detail herein.

Referring now to FIG. 1, an omni-directional antenna 40 that may be located on a cylindrical body 53 is shown. The omni-directional antenna 40 may include a plurality of antenna traces 45 that may define multiple antennas or define one or more continuous loop antennas. Each loop may have one or more turns or windings of the plurality of antenna traces 45. In one embodiment, the omni-directional antenna 40 is printed directly on the cylindrical body 53. In another embodiment, the omni-directional antenna 40 is printed directly on a flexible substrate 50. The flexible substrate 50 may be, for example, a protective layer placed on the cylindrical body 53 by an adhesive, a multi-layered printed circuit board that is flexible, and/or a shrinkable material that allows the flexible substrate 50 to be coupled to the cylindrical body 53. The shrinkable material may be placed over the cylindrical body 53 and thermally or light activated to shrink and conform the flexible substrate 50 to the cylindrical body 53.

In some embodiments, the flexible substrate 50 may be an electromagnetic field (EMF) deflector for use on the cylindrical body 53 if, for example, the cylindrical body 53 is made from any material that may conduct or circulate currents (Eddy currents) as a result of exposure to a magnetic field, such as time varying magnetic field. Materials that may conduct or circulate currents when exposed to a magnetic field may include any ferrous and/or non-ferrous metal or any material with the ability to conduct a finite amount of electrons. The EMF deflector may be painted, printed, or glued to the cylindrical body 53 and may serve to block or diminish any magnetic fields either induced by the omni-directional antenna 40 and/or induced by the environment from producing Eddy currents in the cylindrical body 53. The EMF deflector may be a flexible ferrite shield that is coupled to the cylindrical body 53 or made from any other material with high magnetic permeability at a specified frequency. Another name for the EMF deflector may be a "magnetic diverter" as shown and described in U.S. Provisional Application No. 61/746,265 which is herein incorporated by reference in its entirety. The EMF deflector should not be electrically conductive to prevent Eddy currents from forming and collapsing the field around the antenna. Other materials may be used as the ferrite shield which provide a high magnetic permeability with electrical isolation such as, for example, iron, nickel, or cobalt and their corresponding alloys which are not electrically conductive. The EMF deflector may allow RFID/NFC technology to work on the cylindrical body 53 that may conduct or circulate currents as a result of exposure to a magnetic field.

Figure 6:
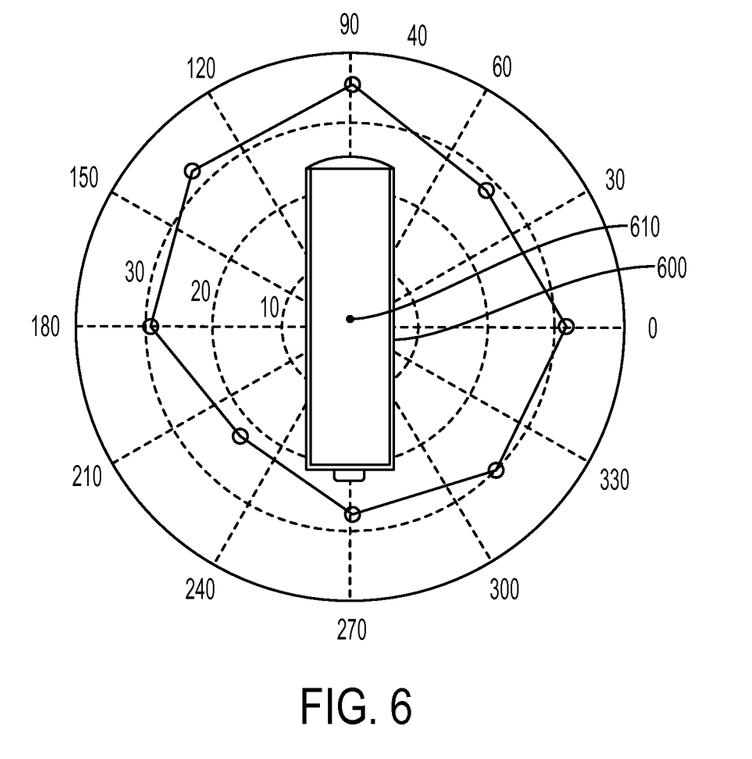
FIG. 6 illustrates a read range of the folded antenna rotated about a center of its curved surface according to one or more embodiments shown and described herein.
Figure 7:
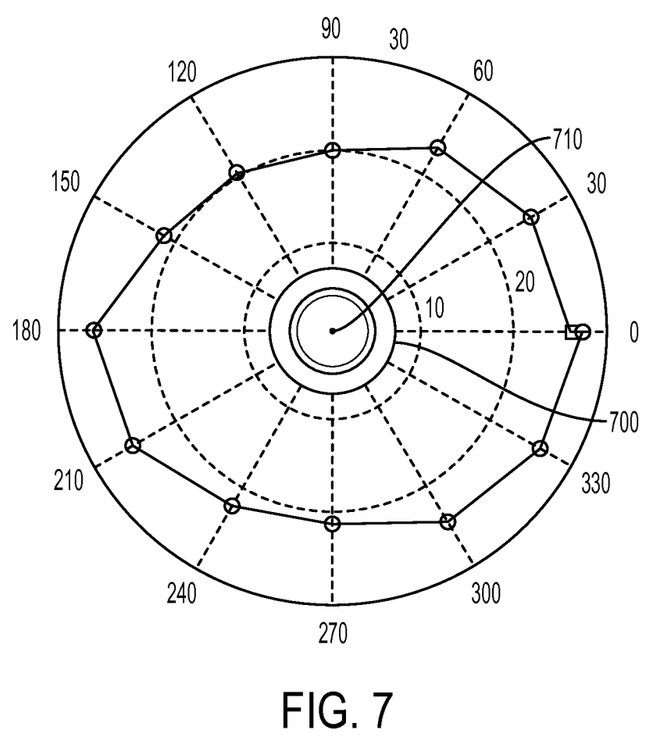
FIG. 7 illustrates the read range of the folded antenna rotated about its long axis according to one or more embodiments shown and described herein.

Referring to FIGS. 1, 6 and 7, a long axis 710 is shown along the length of the cylindrical body's 53 center. A circular end view 83 is visible when viewing the cylindrical body 53 along the long axis 710 as shown in FIG. 7. A longitudinal view 82 is visible when viewing the cylindrical body 53 perpendicular to the long axis 710 as shown in FIG. 6.

In another embodiment, the EMF deflector may be interposed or situated between the cylindrical body 53 and the flexible substrate 50. The EMF deflector may be painted, printed, or glued to the cylindrical body 53 and the flexible substrate 50 may be shrunk or adhered to the EMF deflector.

A chip location 55 may be positioned anywhere on the flexible substrate 50 but it is preferably near a first terminal 60 and a second terminal 65 of the antenna trace 45. The first terminal 60 and the second terminal 65 may provide joint connections for solder, conductive adhesive, ultrasonic welding, or crimping of an integrated circuit (IC). The IC may comprise a communication circuit, and/or an analog-to-digital (ADC) chip electrically coupled together to perform a function. The IC may include other circuits to include, but not limited to, an indication circuit, a power circuit, a RFID chip, a NFC chip, an input/output circuit or port, etc. The IC may physically co-locate the communication circuit and ADC together side-by-side or physically integrate them together. The IC may be coupled to the flexible substrate 50 or it may be coupled directly to the cylindrical body 53. The IC may also comprise an ASIC that is specifically manufactured to encompass the performance of the function required. The function may be to determine a specified condition of a battery and relay that information to a reader in the form of function information. The function may also be to signally communicate a notification of the specific condition of the battery or the function may be to provide an indication of the specified condition of the battery which may include audible, visible, or pallesthesia indications. Pallesthesia is the ability to sense a vibration and a pallesthesia indication is a mechanical or electromechanical means to provide the sense of vibration. The specified condition of the battery may include the power output of a battery, rate of discharge, when the battery is nearing the end of its useful life and provide an indication that it needs to be used or replaced, or a state of charge of the battery. The function may be to provide function information concerning: over-discharge protection; over-charge protection; remaining capacity determination; voltage determination; cycle life determination; and power management. Power management functions may include battery identification; battery state of health; battery protection; cell balancing; fuel gauging; charge control; voltage conversion; load regulation; powering battery on/off; power setting adjustment; allow or prevent recharging; battery by-pass; temperature monitoring; and charging rate adjustment. Function information may also include identification information as described below.

A first lead 70 and a second lead 75 may be used to couple to the ends of the cylindrical body 53. The first lead 70 and the second lead 75 may not cross the antenna trace 45 and may be either printed either directly on the cylindrical body 53 or on the flexible substrate 50. The first lead 70 and/or the second lead 75 may be electrically isolated from the cylindrical body 53. If for example, the cylindrical body 53 is a battery, the first lead 70 may extend from the chip location 55 to the upper battery end (anode) and remain electrically isolated from the battery till it is electrically coupled to the upper battery end. The second lead 75 may also extend from the chip location 55 to the lower battery end (cathode) or the second lead 75 may terminate on the cylindrical body 53 at the chip location 55. The first lead 70 and the second lead 75 may be coupled to the ends of the cylindrical body 53 by conductive adhesive such as, for example a silver epoxy, or by ultrasonic welding.

The IC, for example, may physically integrate and electrically couple together the RFID chip and/or the NFC chip, ADC, the first terminal 60, the second terminal 65, the first lead 70 and the second lead 75. The IC may also be configured with a unique identifier (RFID tag equivalent) that indicates either a unique sequence of numbers/symbols or information such as, for example, manufacturing date, lot number, serial number, and the other identifiable information. The IC may be configured to sense a voltage of a battery with a first lead electrically coupled to an anode of the battery and a second lead electrically coupled to a cathode of the battery. The IC may sense the voltage between the anode and cathode of the battery and signally report that voltage to a reader.

Figure 2A:
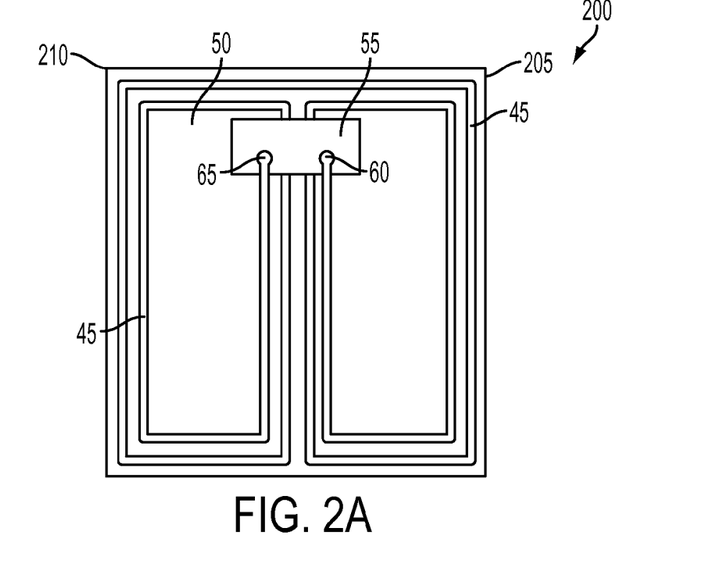
FIGS. 2A and 2B depict an out-of-phase configuration of a two symmetrical loop omni-directional antenna according to one or more embodiments shown and described herein.
Figure 2B:
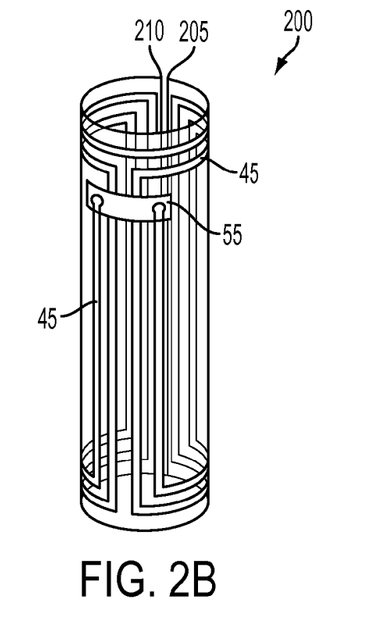
Figure 3A:
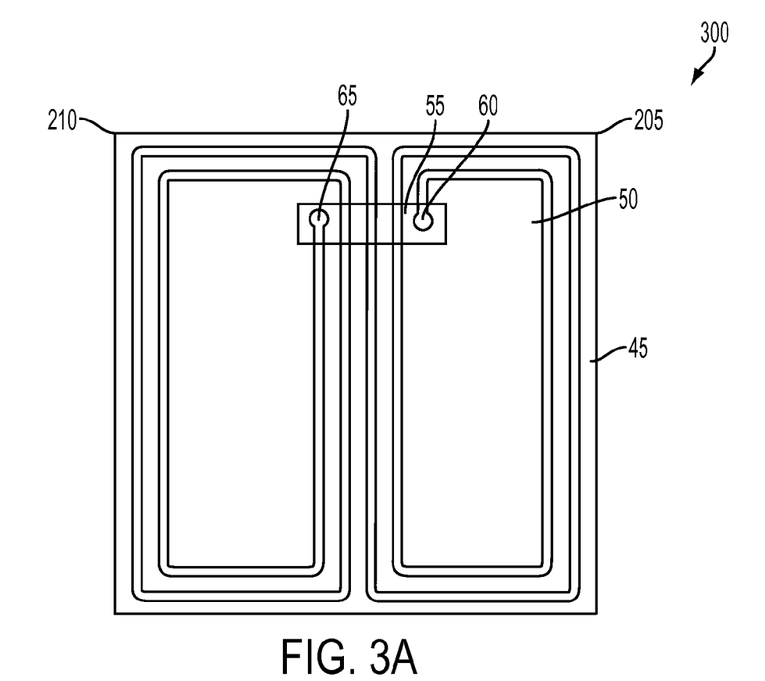
FIGS. 3A, 3B, 3C, and 3D depict an in-phase configuration of the two symmetrical loop omni-directional antenna according to one or more embodiments shown and described herein.

FIGS. 2A and 2B illustrate an out-of-phase configuration 200 of a two symmetrical loop omni-directional antenna. FIGS. 3A, 3B, 3C and 3D illustrate an in-phase configuration 300 of the omni-directional antenna with two symmetrical loops. FIGS. 2A and 3A depict the two symmetrical loop omni-directional antenna flat for clarity of the non-overlapping two symmetrical loops. In one embodiment, the two symmetrical loop omni-directional antenna may be printed directly on the cylindrical body. In another embodiment, the two symmetrical loop omni-directional antenna may be printed on the flexible substrate 50 as described above. The flexible substrate 50 may have a first edge 205 and a second edge 210. Each symmetrical loop of the two symmetrical loop omni-directional antenna may include one, two, or more turns of the antenna trace 45.

The two symmetrical loop omni-directional antenna is shown in an out-of-phase configuration 200 in FIGS. 2A and 2B and in the in-phase configuration 300 in FIGS. 3A, 3B, 3C and 3D. When the two symmetrical loop omni-directional antenna is coupled to the cylindrical body, the two loops of the two symmetrical loop omni-directional antenna are at about 180 degrees apart (opposite sides of the cylindrical body) from each other which may allow for better signal communication between the two symmetrical loop omni-directional antenna and a reader (not shown). The out-of-phase configuration 200 provides for increased signal fidelity at the cylindrical ends (top and bottom) of the cylindrical body where the circular sections of the antenna trace 45 along a top section and a bottom section of the cylindrical body are in phase with one another and the long axis sections of the antenna trace 45 cancel out. The term "in phase" may include situations where a wave form is in sync or where the frequency of two or more waveforms are the same and their positive and negative peaks occur at the same time. The term "cancel out" may include situations where two or more waveforms are out-of-phase by about 180 degrees and have the same frequency and amplitude.

Figure 3B:
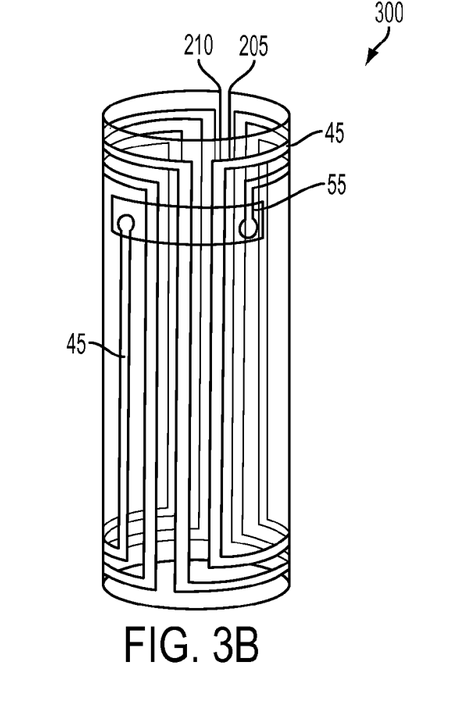

FIGS. 2B and 3B depict the two symmetrical loop omni-directional antenna on the flexible substrate 50 from FIGS. 2A and 3B respectively that may be wrapped around the cylindrical body (not shown). There is no overlap between the first edge 205 and the second edge 210. The chip location 55 and the first terminal 60 and the second terminal 65 are shown and work as described above. In this illustrative embodiment, when the flexible substrate 50 is wrapped around a cylindrical object, the first edge 205 and the second edge 210 are substantially parallel to each other. In another embodiment, the two symmetrical loop omni-directional antenna may not be limited to having a first edge 205 and a second edge 210 and may be printed on the flexible substrate 50 that is cylindrical in shape as shown in FIG. 1. The cylindrical shaped flexible substrate 50 may slide over the cylindrical body and may not be wrapped around as illustrated in FIG. 2B.

FIGS. 3A, 3B, 3C, and 3D depict an in-phase configuration 300 of the two symmetrical loop omni-directional antenna with each symmetrical loop having two turns. The two symmetrical loop omni-directional antenna may be either printed directly on the cylindrical body or onto the flexible substrate 50 as described above. In the in-phase configuration 300, the antenna trace 45 connections with the chip location 55 are reversed as shown in the out-of-phase connection of FIGS. 2A and 2B. The in-phase configuration 300 increases signal fidelity along the long axis of the cylindrical body where the circular sections of the antenna trace 45 are out-of-phase with one another and cancel out and the long axis sections of the antenna trace 45 are in-phase.

Figure 3C:
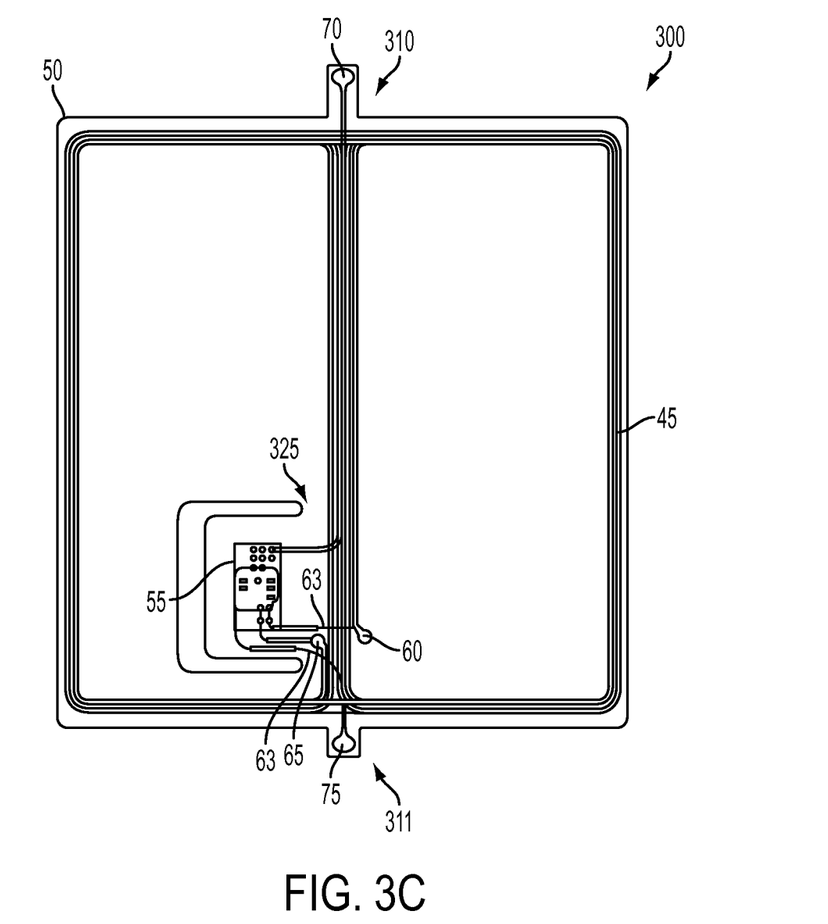
Figure 3D:
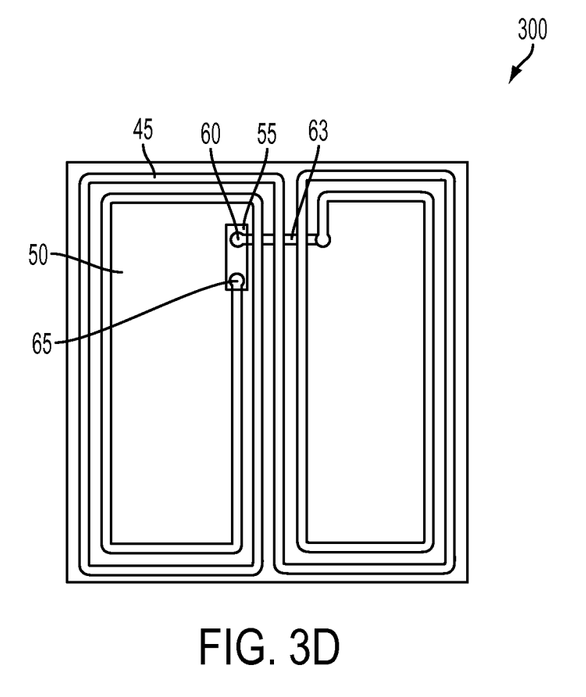

In some embodiments, the flexible substrate 50 may be a multi-layer printed circuit board (PCB). The first terminal 60 may be electrically coupled to the IC on the chip location 55 via a different layer on the multi-layered PCB than the antenna trace 45. This may allow the overlap of traces as shown in FIGS. 3A and B without electrically coupling the traces together. Furthermore, the first lead 70 and the second lead 75 may also be on a separate layer of the multi-layered PCB to facilitate the crossing of the first lead 70 and the second lead 75 with the antenna trace 45. As shown in FIGS. 3C and 3D, a bridge 63 may be needed to allow for the electrical coupling of the IC to the first terminal 60 and the second terminal 65 as described in greater detail below.

Referring to FIG. 3C, the flexible substrate 50 may be recessed or cut out to reduce the thickness of the battery label. A first tab 310 of the flexible substrate 50 may provide structure for the first lead 70 and may be folded over to flexibly couple the first lead 70 to the top of the cylindrical body. A second tab 311 of the flexible substrate 50 may provide structure for the second lead 75 and may be folded over to flexibly couple the second lead 75 to the bottom of the cylindrical body.

Figure 4:
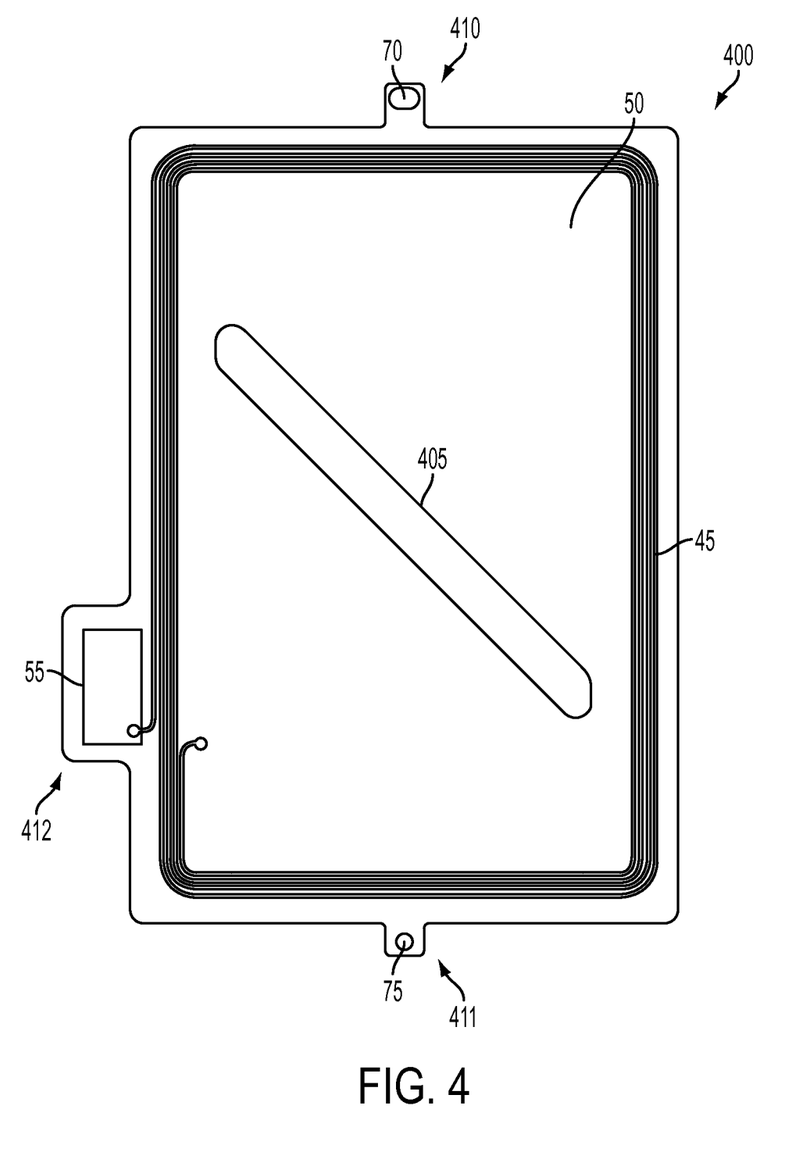
FIG. 4 depicts a folded antenna according to one or more embodiments shown and described herein.

FIG. 4 depicts a folded antenna 400 on the flexible substrate 50. The folded antenna 400 may have the antenna trace 45 creating at least one continuous loop. In one embodiment, the antenna trace 45 creates a continuous loop antenna with at least three turns or more preferably at least five turns. An aperture 405 is disposed within the flexible substrate 50. The flexible substrate may have three extended sections, a first extended section 410, a second extended section 411, and a third extended section 412. The three extended sections (410, 411, and 412) are used to provide a mounting surface for a component of the folded antenna 400. For example: the first extended section 410 may be used to flexibly couple the first lead 70 to the cylindrical body; the second extended section 411 may be used to flexibly couple the second lead 75 to the cylindrical body; and the third extended section 412 may be used to flexibly couple the chip location 55 to the folded antenna 400.

Figure 5A:
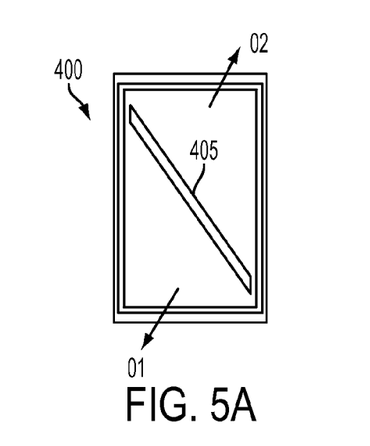
FIGS. 5A, 5B, and 5C depict the steps to wrap the folded antenna around a cylindrical body are shown according to one or more embodiments shown and described herein.
Figure 5B:
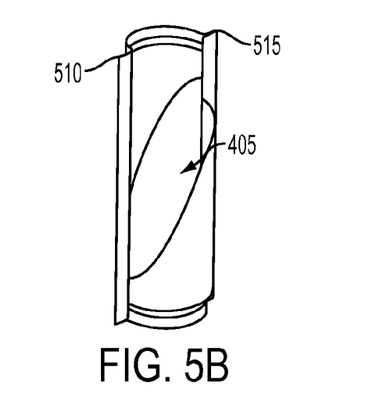
Figure 5C:
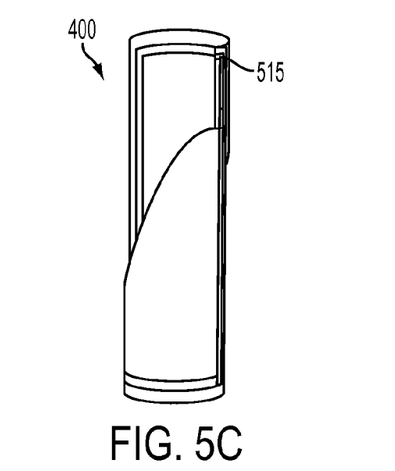

FIGS. 5A, 5B, and 5C depict steps for wrapping the folded antenna 400 from FIG. 4 around the cylindrical body. In FIG. 5A, the aperture 405 of the folded antenna 400 is pulled open. Arrow 01 indicates the lower section below the aperture 405 is pulled away from the upper section represented by the arrow 02 resulting in a shape found in FIG. 5B. A first flap 510 and second flap 515 are then "folded" to lay flat and conform to the cylindrical body. FIG. 5C illustrates the final form of the folded antenna 400. The second flap 515 is shown against the folded antenna 400.

FIG. 6 illustrates the read range using the folded antenna 400 as a cylindrical body 600 is rotated 360 degrees about a center 610 of its curved surface in front of a reader (not shown). The distance from the center of the cylindrical body 600 is measured in millimeters. The read range around the anode and cathode of the battery may be from about 25 to about 35 mm from the center 610 of the battery. The read range may be about 30 mm from the center 610 of the battery along the long axis of the battery.

FIG. 7 illustrates the read range using the folded antenna 400 as a cylindrical body 700 is rotated 360 degrees about its long axis 710 in front of a reader (not shown). The distance from the center of the cylindrical body 700 is measured in millimeters. The read range, as the battery is rotated about its long axis 710, may be from about 20 mm to about 28 mm. The read range of the folded antenna 400 may provide a more consistent read range as the battery is rotated about its long axis 710.

Figure 8:
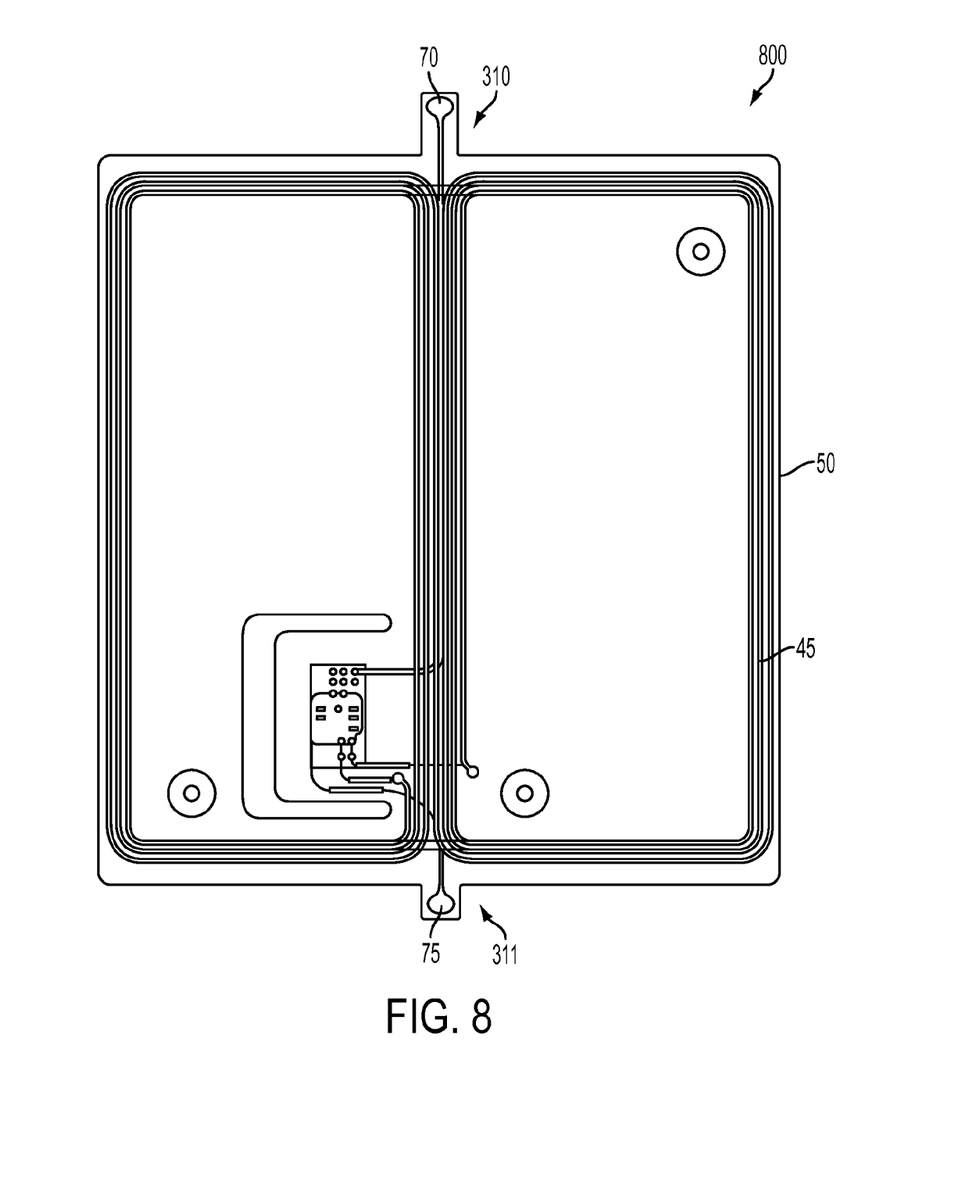
FIG. 8 depicts an in-phase configuration of a two symmetrical loop omni-directional antenna according to one or more embodiments shown and described herein.

FIG. 8 depicts a two symmetrical loop omni-directional antenna 800 in an in-phase configuration with three turns per symmetrical loop. The two symmetrical loop omni-directional antenna 800 may be either printed directly on the cylindrical body or onto the flexible substrate 50 as described above. The in-phase configuration increases signal fidelity along the long axis of the cylindrical body where the circular sections of the antenna trace 45 are out-of-phase with one another and cancel out and the long axis sections of the antenna trace 45 are in-phase.

A first tab 310 of the flexible substrate 50 may provide structure for the first lead 70 and may be folded over to flexibly couple the first lead 70 to the top of the cylindrical body. A second tab 311 of the flexible substrate 50 may provide structure for the second lead 75 and may be folded over to flexibly couple the second lead 75 to the bottom of the cylindrical body.

It should be understood that the present disclosure is not limited to a maximum of three symmetrical loops but may be of any number required to achieve the desired read range. As explained below in regards to the communication circuit, a low-frequency (from about 125 kHz to about 134.2 kHz and from about 140 kHz to about 148.5 kHz), a high-frequency (about 13.56 MHz) or a ultra-high frequency (from about 868 MHz to about 928 MHz) may be used to conform to RFID standards already in use around the globe. The corresponding IC input capacitance and antenna inductance must be accounted for in deciding how many symmetrical loops and or how many turns per symmetrical loop may be used to provide a LC (inductance and capacitance) tank circuit with a tunability range to meet the RFID chip and RFID chip reader resonance frequencies.

Figure 9:
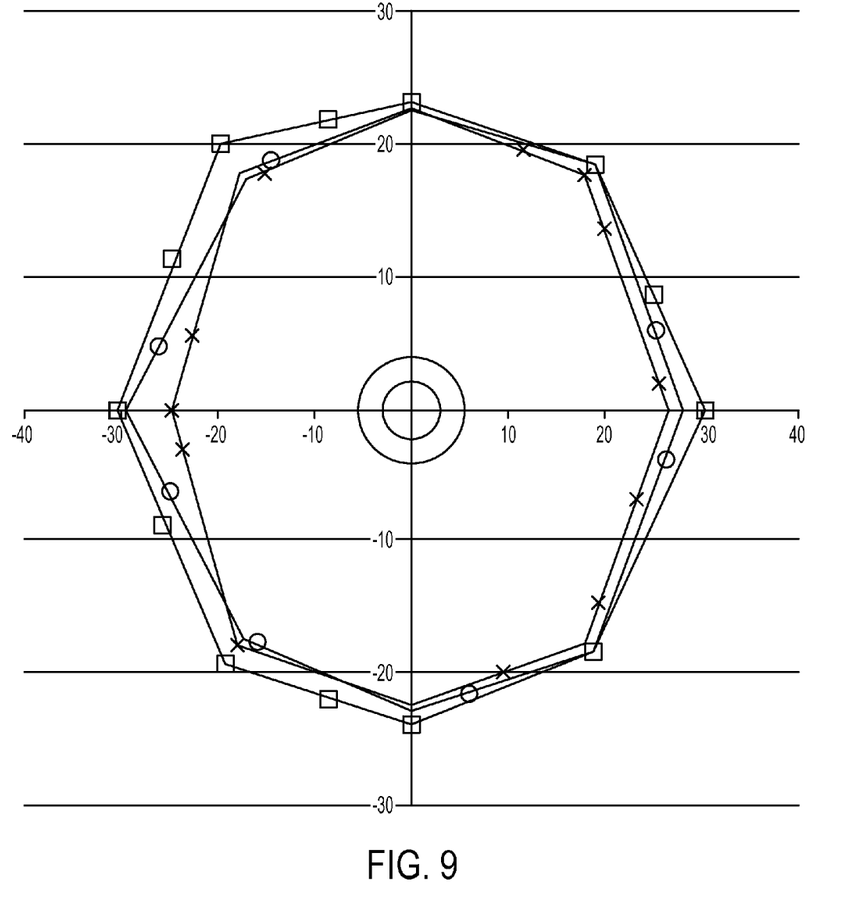
FIG. 9 illustrates a read range of several omni-directional antenna embodiments according to one or more embodiments shown and described herein.

FIG. 9 illustrates the read range in millimeters (mm) of several embodiments of the two symmetrical omni-directional antenna for cylindrical bodies. The two turns per symmetrical loop (circle) omni-directional antenna, a three turns per symmetrical loop(square) omni-directional antenna, and the five turn folded (X) omni-directional antenna are shown for comparison in the in-phase configuration. The two symmetrical loop (circle) omni-directional antenna may have a read range of about 18 mm to about 30 mm. The three turns per symmetrical loop (square) omni-directional antenna may have a read range of about 22 mm to about 33 mm. The five turn folded (X) omni-directional antenna may have a read range of about 22 mm to about 25 mm.

Referring to FIGS. 1-4 and 8, printing either the antenna or flexible substrate 50 may include either a machine that defines the antenna or flexible substrate 50 through the use of screen, gravure, or ink jet printing to apply the material onto a subject surface (cylindrical body or flexible substrate) such as RF sputtering technique, impact or pressure is applied to define material on the subject surface, metal foil mask and etch technique, or a heat or light activated material that is applied to the subject surface.

The antenna trace 45, the first terminal 60, the second terminal 65, the first lead 70, and the second lead 75 may be made from copper, aluminum, silver, gold, or other conductive metals. Other examples include conductive polymers, conductive glues, and conductive carbon, such as graphite. In one embodiment, the antenna trace 45, the first terminal 60, the second terminal 65, the first lead 70, and the second lead 75 may be printed as described above. In another embodiment, the antenna trace 45, the first terminal 60, the second terminal 65, the first lead 70, and the second lead 75 may be a pre-formed wire that is either insulated or bare. If the pre-formed wire is bare, it may be covered by a non-conductive sheet, a non-conductive tape, a non-conductive flexible substrate, or a non-conductive shrink wrap. For example, the non-conductive sheet or shrink wrap may be a product label.

In one embodiment, the IC may be powered by the battery 10 (active). In another embodiment, the IC may be only powered by the battery when a reader is detected 10 (battery-assisted passive) and in yet another embodiment, the IC may not be powered by the battery (passive), e.g., powered by energy harvesting from external power source.

The communications circuit may use any suitable communications protocol such as, but not limited to, radio-frequency identification (RFID) circuitry (RFID tag) and/or near field communication (NFC) circuitry (NFC tag) as included within, for example, ISO/IEC 14223, 14443, 15693, 15961, 15962, 15963, 18000, 18092, and 21481 communication standards; Bluetooth circuitry as included within, for example, IEEE 802.15.1 communication standard; WiFi circuitry as included within, for example, IEEE 802.11 communication standard; Zigbee circuitry as included within, for example, IEEE 802 communication standard; and any suitable fixed wireless communication circuitry. The communications circuit may utilize any suitable frequency bands such as high frequency (HF), ultra-high frequency (UHF), or microwave frequency.

It should be understood that this disclosure is not limited to a single battery and may apply to any cylindrical body or objects that uses a RFID tag (chip) or NFC tags (chip) for monitoring its status. For example, the cylindrical body may be a rechargeable battery, a fuel cell, a stack of coin batteries, or a stack of cylindrical batteries. Cylindrical batteries may include, for example, AAAA, AAA, AA, C, D, CR2, A123, and other batteries with a cylindrical shape.

The reader may be any device capable of reading the RFID tag or NFC tag. Specific examples may include a smartphone, tablet, personal computer (PC), dedicated RFID tag reader, a dedicated NFC tag reader, a handheld computing device, or a wand antenna electrically coupled to a computing device. The reader may be used to excite the IC by transmitting an interrogation signal or may transmit a "wake-up" signal to the IC. The interrogation signal may be a RF pulse of a predetermined frequency used to energize the circuit in the IC and provide power to the IC to transmit its function information. The "wake-up" signal may also be a RF pulse but the IC may use power from another source to power the IC and to transmit its function information. The reader may include a display to visibly present the function information or audible device capable of audibly presenting the function information. The reader may also include algorithms to interpret and/or modify the function information before presenting.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "top", "bottom", "upper", and "lower" designate directions in the drawings to which reference is made. The terminology includes the words noted above as well as derivatives thereof and words of similar import.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A folded antenna for a cylindrical battery, comprising:
a flexible substrate comprising an aperture formed in a surface of the flexible substrate, the aperture configured to allow the cylindrical battery to pass therethrough such that the flexible substrate can be wrapped around the cylindrical battery;
an antenna with a first terminal and a second terminal coupled to the flexible substrate; and
an integrated circuit coupled to the first terminal and the second terminal;
wherein the antenna comprises an antenna trace creating at least one continuous loop on the surface of the flexible substrate, and
wherein the aperture formed in the surface of the flexible substrate is disposed within the at least one continuous loop of the antenna trace.

2. The folded antenna of claim 1, wherein the flexible substrate comprises an electromagnetic field deflector.

3. The folded antenna of claim 1, wherein the flexible substrate is selected from the group consisting of a protective layer, a multi-layered printed circuit board that is flexible, and a shrinkable material capable of being placed over the cylindrical body and thermally or light activated to shrink and conform the flexible substrate to the cylindrical body.

4. The folded antenna of claim 1, wherein the cylindrical battery is an alkaline battery.

5. The folded antenna of claim 1, wherein the continuous loop of the antenna trace comprises more than three turns.

6. The folded antenna of claim 5, wherein the integrated circuit further comprises an analog to digital converter and a communication circuit, the integrated circuit is configured to sense a condition of the battery and to signally communicate the condition of the battery.

7. The folded antenna of claim 6, wherein the condition of the battery is chosen from the group consisting of over-discharge protection, over-charge protection, remaining capacity determination, voltage determination, cycle life determination, and power management.

8. The folded antenna of claim 1, wherein the integrated circuit is a radio frequency identification chip or a near field communication chip.

9. The folded antenna of claim 1, comprising a first extended section, a second extended section, and a third extended section, wherein at least one of the first extended section, the second extended section, and the third extended section provide a mounting surface for a component of the folded antenna.

10. The folded antenna of claim 9, wherein the first extended section is configured to flexibly couple to an anode of the battery, and wherein the second extended section is configured to flexibly couple to a cathode of the battery, and the third extended section flexibly couples to the integrated circuit.

11. The folded antenna of claim 1, wherein the aperture is oriented substantially diagonally across the surface of flexible substrate.

12. A method to wrap a folded antenna around a cylindrical battery, comprising:
providing a folded antenna comprising a flexible substrate having a first flap, a second flap, and an aperture formed in a surface of the flexible substrate, wherein the aperture is defined by the first and second flaps;
pulling on at least one of the first and second flaps to open the aperture;
inserting the cylindrical battery within the aperture formed in the surface of the flexible substrate to allow the first and second flaps to conform the folded antenna to the cylindrical battery.

13. The method of claim 12, wherein the cylindrical battery is an alkaline battery.

14. The method of claim 12, wherein the folded antenna comprises an integrated circuit that is a radio frequency identification chip or a near field communication chip.

15. The method of claim 14, wherein the integrated circuit further comprises an analog to digital converter and a communication circuit, the integrated circuit is configured to sense a condition of a battery and signally communicate the condition of the battery.

16. The method of claim 15, wherein the integrated circuit signally communicates the condition of the battery to a reader, the reader is chosen from the group consisting of a smartphone, tablet, personal computer, dedicated radio frequency identification tag reader, a dedicated near field communication tag reader, a handheld computing device, and a wand antenna electrically coupled to a computing device.

17. The method of claim 12 wherein the folded antenna comprises a ferrite shield conformed to the cylindrical battery and a continuous loop antenna with a first terminal and a second terminal printed on the ferrite shield, and
wherein the folded antenna comprises an integrated circuit electrically coupled to an anode of the battery and a cathode of the battery and comprising an analog to digital converter and a communication circuit,
wherein the integrated circuit is configured to sense a condition of the battery and signally communicate the condition to a reader.

18. The method of claim 17, wherein the integrated circuit further comprises a radio frequency identification chip or a near field communication chip.

19. The method of claim 17, wherein the condition of the battery is chosen from the group consisting of over-discharge protection, over-charge protection, remaining capacity determination, voltage determination, cycle life determination, and power management.

20. The method of claim 17, wherein the folded antenna comprises a first extended section, a second extended section, and a third extended section.

21. The method of claim 20, wherein the first extended section is configured to flexibly couple to an anode of the battery, and wherein the second extended section is configured to flexibly couple to a cathode of the battery, and wherein the third extended section flexibly couples to the integrated circuit.

22. The method of claim 12, wherein the aperture is oriented substantially diagonally across the surface of flexible substrate.

* * * * *